United States Patent
Boss et al.

(10) Patent No.: US 9,836,186 B2
(45) Date of Patent: Dec. 5, 2017

(54) VISUALIZATION AND CONTROL OF APPLICATION INTERACTIONS

(71) Applicant: INTERNATIONAL BUSINESS MACHINES CORPORATION, Armonk, NY (US)

(72) Inventors: Gregory J. Boss, Saginaw, MI (US); Andrew R. Jones, Round Rock, TX (US); Charles S. Lingafelt, Durham, NC (US); Kevin C. McConnell, Austin, TX (US); John E. Moore, Jr., Brownsburg, IN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/945,767

(22) Filed: Nov. 19, 2015

(65) Prior Publication Data

US 2017/0147667 A1    May 25, 2017

(51) Int. Cl.
*G06F 3/0482* (2013.01)
*G06F 17/30* (2006.01)
*G06F 3/0481* (2013.01)
*G06F 11/00* (2006.01)

(52) U.S. Cl.
CPC ........ *G06F 3/0482* (2013.01); *G06F 3/04817* (2013.01); *G06F 11/00* (2013.01)

(58) Field of Classification Search
CPC ............... G06F 17/30; G06F 17/30572; G06F 3/04817; G06F 3/0482; G06F 17/3053; G06F 17/30554

USPC ........................................................ 707/734
See application file for complete search history.

(56) References Cited

U.S. PATENT DOCUMENTS

| | | | |
|---|---|---|---|
| 7,664,729 B2 | 2/2010 | Klein et al. | |
| 8,006,224 B2 | 8/2011 | Bateman et al. | |
| 8,689,126 B2 | 4/2014 | Kalaidjian | |
| 8,826,234 B2 | 9/2014 | Cormack et al. | |

(Continued)

OTHER PUBLICATIONS

Engelson, "Tools for Design, Interactive Simulation, and Visualization of Object-Oriented Models in Scientific Computing", Linköping Studies in Science and Technology, Dissertation No. 627, Apr. 2000, 343 pages.

(Continued)

*Primary Examiner* — Andrea Leggett
(74) *Attorney, Agent, or Firm* — Lisa Ulrich; Andrew D. Wright; Roberts Mlotkowski Safran Cole & Calderon P.C.

(57) ABSTRACT

Systems and methods for visualization and control of application interactions are disclosed. An approach includes receiving a selection of a primary application, retrieving information regarding a relationship between the selected primary application and at least one of another application and a computer device resource, and calculating a thickness value for the relationship, wherein the thickness value represents at least one parameter of interest to a user. The approach includes displaying icons representing the selected primary application and the other application(s) and computer device resource(s), and displaying at least one relationship line between the selected primary application and the other application(s)/computer device resource(s), wherein the at least one relationship line has a line weight based on the thickness value.

19 Claims, 5 Drawing Sheets

(56) References Cited

U.S. PATENT DOCUMENTS

| | | |
|---|---|---|
| 8,850,404 B2 | 9/2014 | Cormack et al. |
| 2014/0189650 A1* | 7/2014 | Gounares ............ G06F 11/3636 |
| | | 717/125 |
| 2014/0237020 A1* | 8/2014 | Schachtel ............... H04L 67/02 |
| | | 709/203 |
| 2015/0007084 A1 | 1/2015 | Bansal et al. |
| 2016/0171090 A1* | 6/2016 | Schwartz .......... G06F 17/30604 |
| | | 707/730 |

OTHER PUBLICATIONS

Anonymous, "Tivoli Application Dependency Discovery Manager: SDK Developer's Guide", IBM Corporation 2006, Version 7 Release 2.1, 2014, 160 pages.

Anonymous, "Samsung Galaxy S4 (Generic), Black Mist", http://www.samsung.com/us/support/faq/FAQ00053525/63077/SCH-I545ZKALRA, Date Accessed: Sep. 16, 2015, 9 pages.

List of IBM Patents or Patent Applications Treated as Related, 1 page.

Specification "Visualization and Control of Application Interactions" and Drawings in U.S. Appl. No. 15/730,889, filed Oct. 12, 2017, 37 pages.

\* cited by examiner

VISUALIZATION AND CONTROL OF APPLICATION INTERACTIONS

BACKGROUND

The present invention relates generally to control of application interactions, and more particularly, to a system and method for graphical representation and control of relationships between a computer device application and other applications and/or computer device resources.

It is problematic to troubleshoot relationships between applications on a computer device and to comprehend application interactions with one another and with computer device resources. For example, a smartphone or tablet that has one or more applications may cause undesirable effects such as: sending physical location information to unauthorized cloud applications; accessing personal contact lists; consuming a large proportion of network interface capacity; consuming a larger proportion of storage; accessing other applications or data within those applications; and causing other applications to activate hardware resources. Present methods for visualizing application interactions are limited to a few rudimentary methods for representing battery usage.

Relationships between entities, such as applications and system resources (e.g., memory, central processing unit, battery, and system devices) in an operating system may be controlled through the operating system security models and may involve some type of data store that records decisions on access to those resources. In the case of applications, this data store is often populated by decisions made by the device owner/administrator through explicit requests for sharing of information between applications and/or resources through a user prompt and approval (e.g., "allow this application to access your address book?"). These systems allow these decisions/settings to be changed using basic but cumbersome processes of selecting the application and manually turning off or on the permissions for each attribute/share request.

Certain applications, such as some social media applications, allow a user to control some interactions of the application with other applications and/or resources. However, such control is limited to only select interactions, and it may not be possible to verify that the user's control selection is being implemented by the application.

SUMMARY

In an aspect of the invention, a computer-implemented method includes receiving a selection of a primary application, retrieving information regarding a relationship between the selected primary application and at least one of another application and a computer device resource, and calculating a thickness value for the relationship, wherein the thickness value represents at least one parameter of interest to a user. The method also includes displaying icons representing the selected primary application and the other application(s)/computer device resource(s), and displaying at least one relationship line extending between the selected primary application and the other application(s)/computer device resource(s), wherein the at least one relationship line has a line weight based on the thickness value.

In another aspect of the invention, a computer program product includes a computer usable tangible storage medium having readable program code embodied in the tangible storage medium. The computer program product includes at least one component operable to receive a selection of a primary application, retrieve information regarding a first relationship between the primary application and another application, and retrieve information regarding a second relationship between the primary application and a computer device resource. At least one component is further operable to display icons representing the primary application, the other application, and the computer device resource, display a first relationship line between the primary application and the other application, and display a second relationship line between the primary application and the computer device resource. Each of the first and second relationship lines has a line weight, line type, line color, line behavior, or a combination thereof, that visually imparts relationship information to a user.

In another aspect of the invention, there is a system for visualizing and controlling application interactions. The system includes a CPU, a computer readable memory, and a computer readable storage media. The system also includes program instructions to retrieve information regarding a first relationship between a primary application and another application. The system further includes program instructions to retrieve information regarding a second relationship between the primary application and a computer device resource, and program instructions to display icons representing the primary application, the other application, and the computer device resource. The system includes program instructions to display a first relationship line between the primary application and the other application, and program instructions to display a second relationship line between the primary application and the computer device resource, wherein each of the first and second relationship lines has a line weight, line type, line behavior and/or line color that imparts information regarding at least one parameter to a user. The system includes additional program instructions to receive a selection of one of the first and second relationship lines, program instructions to display at least one parameter control action based on the selection, program instructions to receive a command to execute the at least one parameter control action, and program instructions to execute the at least one parameter control action, wherein the program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to computer-based visualization and control of application interactions or relationships. In particular, the present invention addresses how to visually represent and manipulate relationships pertaining to data and resource sharing, access, and utilization between applications and computer device resources, and may be utilized in conjunction with computer devices whose usage culture is highly graphical, such as smartphones, tablets, etc. Implementations of the present invention can be used when a computer device user wishes to visualize and manage the relationship between a primary application and other applications and/or computer device resources. In embodiments, a graphical user interface (GUI) visually illustrates relationships between a primary application/resource and other applications and computer device resources, and enables direct manipulation of those relationships. The present invention provides a more intuitive and user friendly interface for both visualizing and managing these relationships through a computer device control module.

In embodiments, a diagram is generated on a computer device display showing relationship lines between a primary application icon and other application and/or computer device resource icons (e.g., power source, memory, touch screen, etc.). The relationship lines visually impart information regarding the relationship between the primary application and the other applications and/or resources to a user. The relationship information may be, for example, information regarding a variety of parameters of interest to a user, such as memory usage or power usage. By way of example, a relationship line extending between a social media application icon and a battery icon may have thin line weight when the social media application is not drawing a lot of power from the battery, and may have a thick line weight when the social media application is drawing a lot of power from the battery. Accordingly, a user can easily visualize the relationship between the social media application and the battery (i.e. power usage of the social media application). Line colors, line behaviors (e.g., flashing lines), and/or line styles (e.g., dashed lines, dotted lines, etc.) may be used to visually convey additional relationship information to a user. For example, a flashing red line color may alert a user that the social media application is drawing more power from the battery than is desirable based on a predetermined threshold value. By way of another example, a dashed line between the social media application icon and a contact list icon may indicate that the social media application has read only access to the contact list. Additional examples of relationship information that may be visually conveyed to a user utilizing the present invention are provided in the detailed discussion below.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

Figure 1:
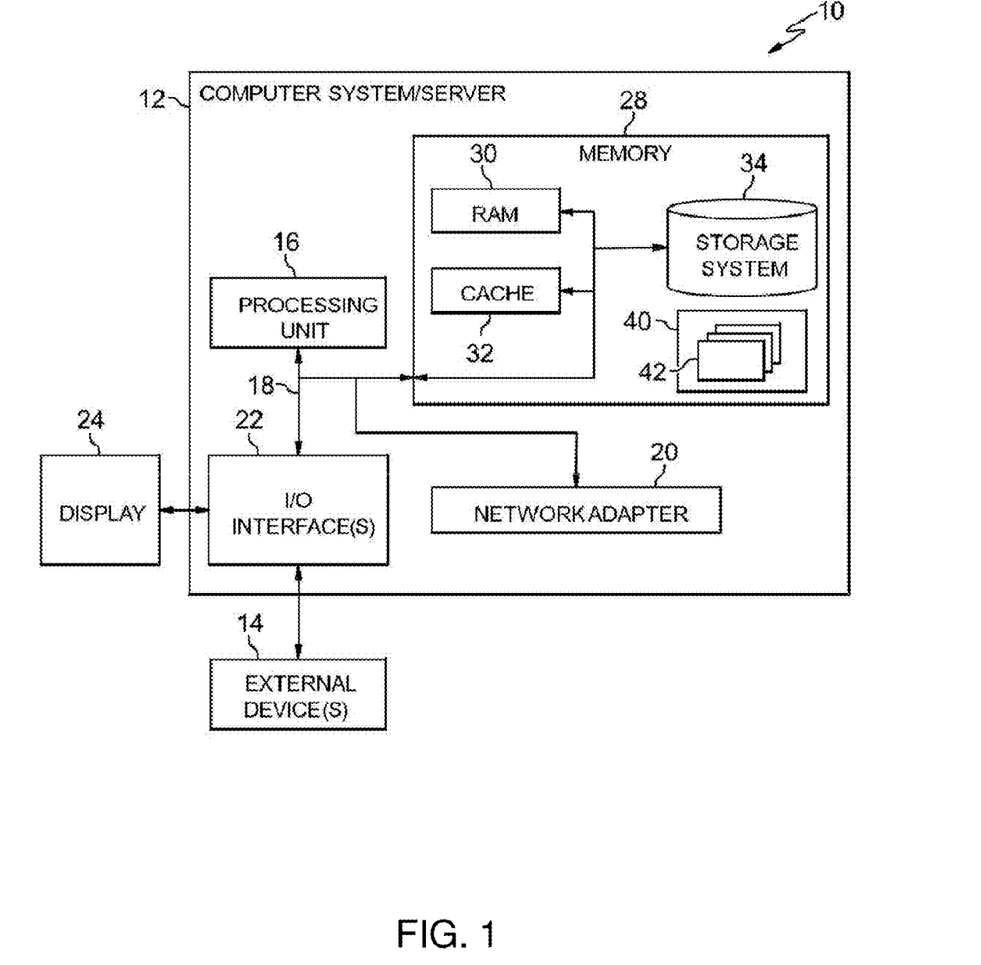
FIG. 1 depicts a computing infrastructure according to an embodiment of the present invention.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
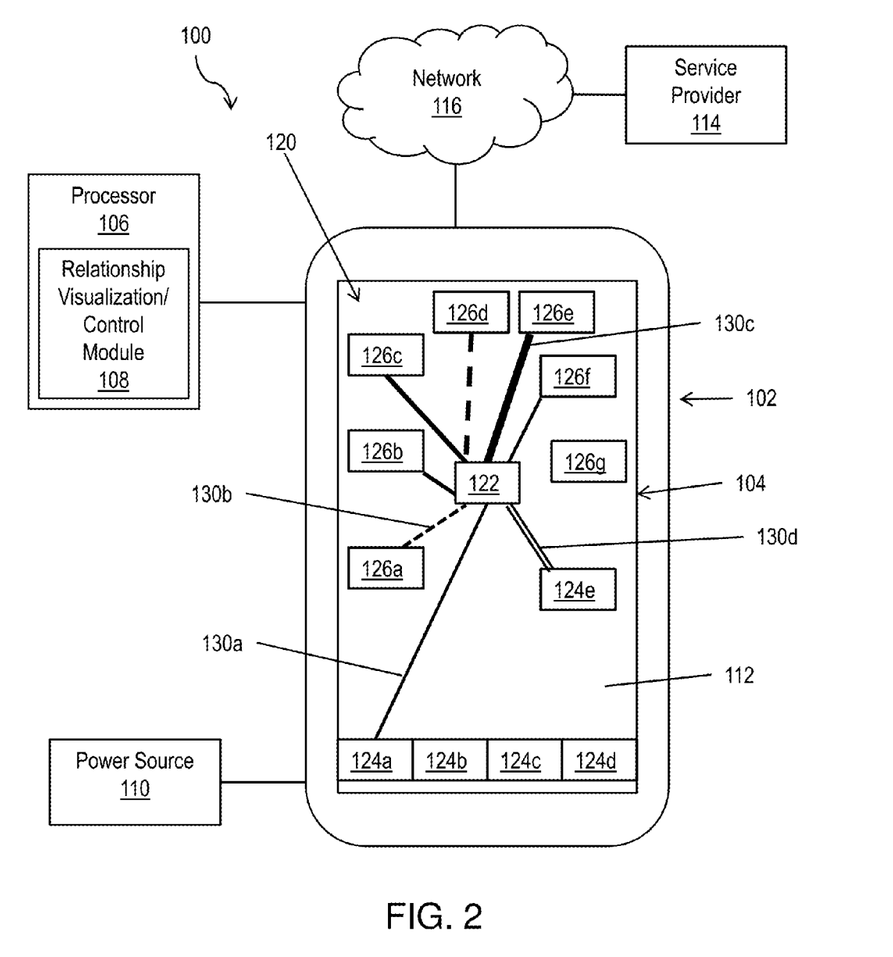
FIG. 2 shows an exemplary system in accordance with aspects of the invention.

FIG. 2 shows an exemplary system 100 in accordance with aspects of the invention. The system includes a computer device 102, having a display or screen 104, a processor 106 and a relationship visualization and control module 108 (hereafter relationship module 108). Computer device 102 also includes a power source 110, and a user interface 112, depicted as a graphic user interface (GUI) or touchscreen in FIG. 2. Although depicted as a touchscreen, it should be understood that user interface 112 can be a mouse, a computer keyboard, or other type of user interface device. Further, while computer device 102 is shown as a mobile computing device, it should be understood that computer device 102 may be any other suitable computing device, such as a smartphone, tablet computer, smart watch, laptop computer, or desktop computer. It should also be appreciated that computer device 102 may be in the form of computer system 12 of FIG. 1, processor 106 may be in the form of processing unit 16 of FIG. 1, and relationship module 108 may be in the form of one or more program modules 42 of FIG. 1.

In embodiments, computer device 102 is in communication with a service provider 114 through a network 116. Network 116 may be any suitable communication network or combination of networks, such as a local area network (LAN), a general wide area network (WAN), and/or a public network (e.g., the Internet).

Still referring to FIG. 2, relationship module 108 of the processor 106 is configured to perform one or more of the functions described herein. In embodiments, relationship module 108 is configured to diagram application relationships on screen 104 and enable management of the relationships through user interface 112. In aspects, relationship module 108 causes a relationship information screen 120 to be displayed on screen 104, wherein the relationship information screen 120 is a specialized screen. In other aspects, relationship information screen 120 can be in the form of the current desktop view of a user. In embodiments, relationship information screen 120 displays a relationship diagram depicting a primary application icon or primary app 122, other application icons (e.g., 124a-124e) and computer device resource icons (e.g., 126a-126g). Icons representing any application or computer device resource may be included on relationship information screen 120, including, for example, icons representing social media applications, global positioning system (GPS) applications, wireless network resources, Bluetooth applications, computer device memory, energy resource (e.g., battery), contact lists, computer browser applications, telephone applications, music applications, email applications, microphone applications, camera applications, touch screen applications etc. In embodiments, a user may customize relationship information screen 120 to include only select application and computer device resource icons.

In aspects, relationship module 108 is configured to display relationship lines (e.g., 130a-130d) between a primary application or primary app (e.g., 122) and other applications (e.g. 124a-124e) and computer device resources (e.g. 126a-126g). Relationship lines visually convey information to a user regarding the relationship between the primary app and other applications and/or computer device resources. The relationship information conveyed by relationship information screen 120 may include information regarding one or more parameters of interest to a user. Parameters may include, for example, the number of relationships, the current application or resource utilized, volume of traffic, an amount of personal information accessible to the primary application, how often information is accessed, one-way communication, two-way communication, historical utilization, the amount of a resource utilized, a potential relationship between a primary app and another application and/or resource, read access, write access, access to secure data, etc. For example, and without limitation, a relationship line may convey information that the primary app (e.g., 122) has access to a photo library of the device, a GPS location module of the device, to read/send email through an email application, or has access to a user's contact list on the device.

In embodiments, plural relationship lines are simultaneously displayed for a single primary app. For example, as shown in FIG. 2, relationship lines 130a-130d are simultaneously displayed to graphically depict respective relationships between primary app 122 and plural other applications 126a-126f and resources 124a, 124e. In this manner, implementations of the invention permit a user to concurrently see all relationships associated with a particular application. Further, in embodiments, no relationship line between a primary app and another application and/or resource conveys to a user that there is no interaction between the primary app and the other application/and or resource. For example, as depicted in FIG. 2, there is no relationship line drawn between primary app 122 and the icon for resource 126g, thereby indicating that primary app 122 does not interact with resource 126g.

In embodiments, relationship lines have a thickness value associated with a line thickness or line weight that visually conveys information. The thickness value can correlate with the intensity, degree or value of a relationship between the primary app and the other application and/or resource. By way of example, primary app 122 of FIG. 2 may be an icon representing a social media application and resource 126e may be an icon representing a battery, wherein relationship line 130c depicts the battery power used by the social media application. In this example, line 130c is thick, representing a high battery power usage by primary app 122.

Relationship lines may also have a line color, a line type (e.g., dashed or dotted) and/or a line behavior (e.g., blinking lines) that imparts additional relationship information. For example, line 130c may be displayed in a bright red color when the battery power used by the primary app 122 exceeds a predetermined threshold value, in order to alert the user of this undesirable relationship state. By way of another example, a hollow line 130d between primary app 122 and another application 124e (e.g., a GPS application) may indicate that the relationship has been disabled or is otherwise inactive. In another example, a dashed line 130b indicates that there is read only access between primary app 122 and resource 126a (e.g., a computer device memory).

Figure 3:
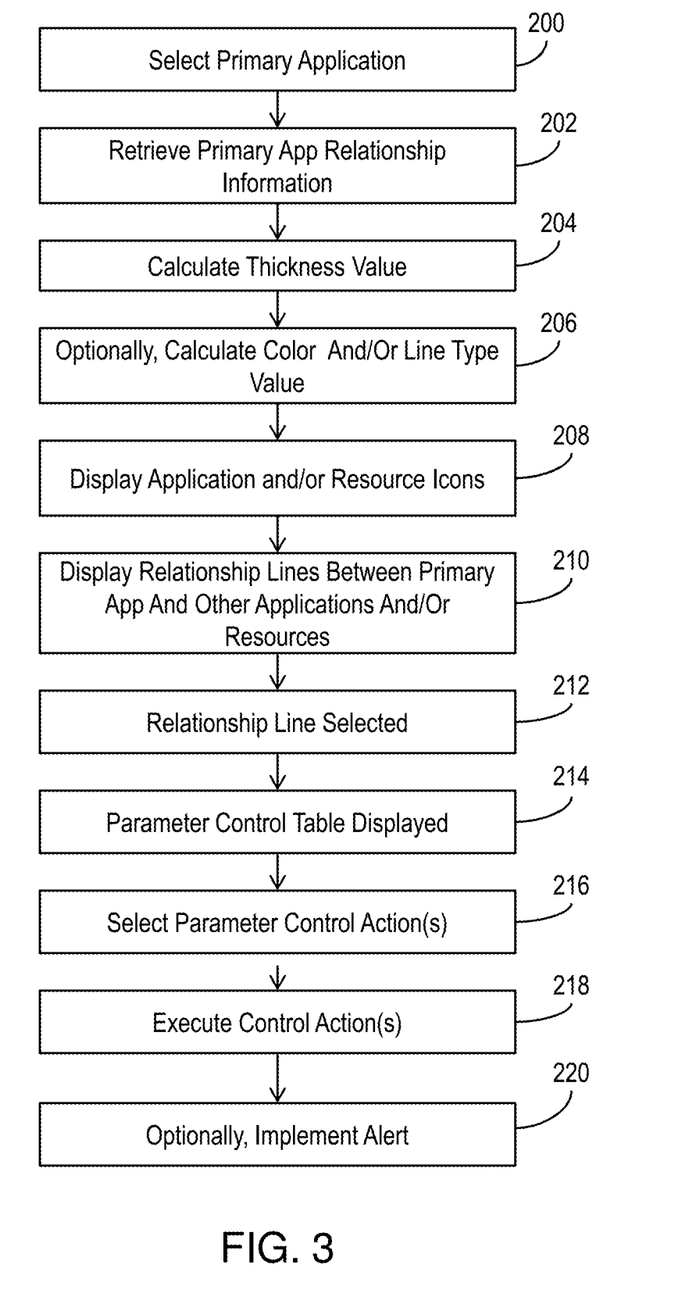
FIG. 3 shows a flowchart of steps of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2.

At step 200 a user selects a primary app (e.g., 122). The primary app may be any application of interest to a user, such as a social media application. The selection of a primary app can be accomplished any number of ways. In one embodiment, the invention is implemented at the OS level and a special desktop page, such as relationship information screen 120, is defined. A user is able to drag an application icon (e.g., 122) from another page to the special desktop page (e.g., relationship information screen 120). This action does not actually move or copy the selected application, but creates a visual representation of the application using its icon. Once "dropped" on the special desktop page, the application can be considered "selected" by relationship module 108 in accordance with step 200. By way of another example, a user may right click on a primary app icon to bring up a right mouse menu enabling a user to select an "execute" function, whereby relationship module 108 would execute steps of the present invention against the selected application. In embodiments, a user can drag an application icon to an icon depicting the relationship visualization system 100 of the present invention, whereby relationship module 108 will execute steps of the present invention against the selected application.

At step 202, relationship module 108 recognizes that a primary app was selected at step 200 and retrieves all relevant relationship information regarding the primary app. Relationship information regarding the primary app can come from any number of sources including, but not limited to: OS security settings (e.g., iOS entitlements), OS configuration management data base (CMDB), a list of all libraries bound to the primary app binary (e.g., network library, Bluetooth library, address book library, etc). This list of sources can change over time and may be device and OS specific. For example, if the primary app is a social media app, relationship information regarding the amount of power, memory and data consumed by the social media application, and the amount and type of data access available to the social media application is retrieved.

At step 204, relationship module 108 calculates a thickness value for each relationship. The thickness value can be based on one or more parameters (e.g., data usage or battery power). One of ordinary skill in the art can understand that a number of different algorithms can be utilized to calculate the thickness value in accordance with the invention. In embodiments, an algorithm is utilized which states that each active relationship (e.g., enabled parameter) has a thickness value of 0.5. The total calculated value is the sum of all active relationships between the primary application and the other application or computer device resource at issue. In this way, a thickness value can be created for every application and/or computer device resource that a primary app interacts with. It should be understood that the thickness value is not limited to a particular unit of measure and can represent centimeters, inches, or standard word processing line weights, for example.

Figure 4:
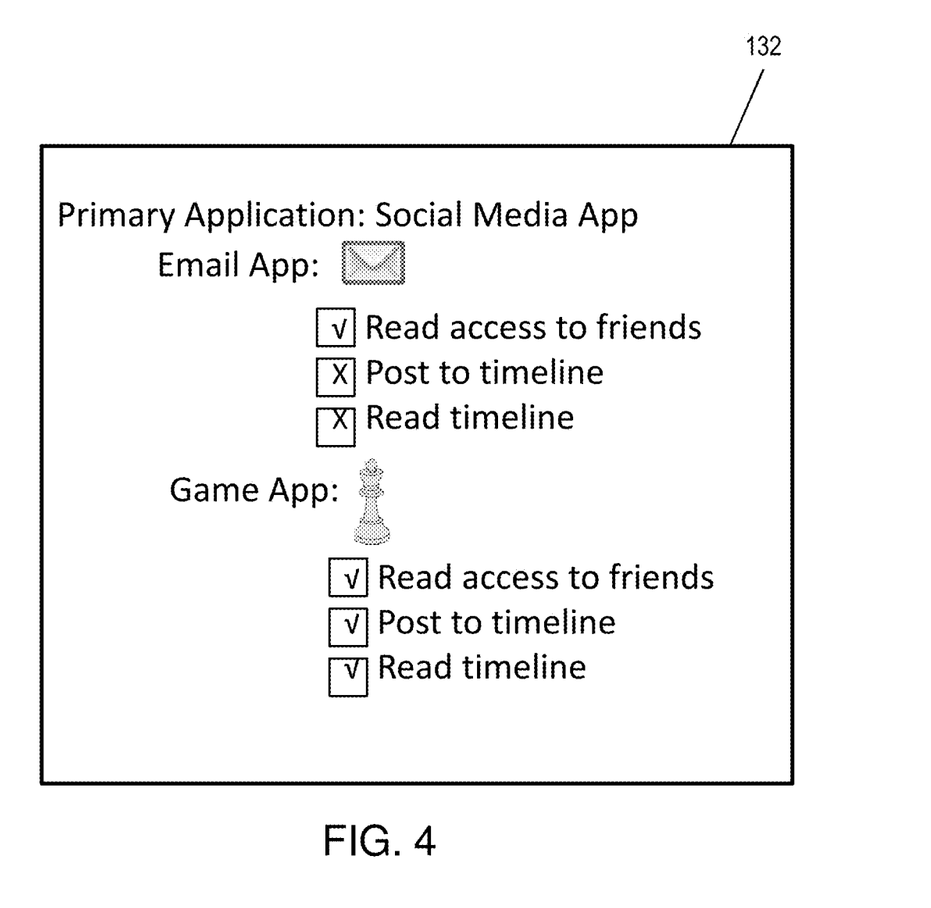
FIG. 4 shows and exemplary table in accordance with aspects of the invention.

In aspects, relationship module 108 can generate an internal table illustrating the relationship data relied on in calculating the thickness value. An example of such a table 132 is illustrated in FIG. 4. Assuming the algorithm discussed above is utilized, the thickness value for a social media application in accordance with FIG. 4 (where check marks represent an enabled parameter and an "X" represents a disabled parameter) would be the sum all active relationships between the social media application and respective email and game applications. Table 132 depicts only one active relationship between the social media app and the email application (i.e. read access to friends), and therefore, the thickness value for the relationship line between the social media application and the email application would be 1×0.5=0.5. However, table 132 depicts three active relationships between the social media app and the game application (i.e. read access to friends, post to timeline, and read timeline), and therefore, the thickness value for the relationship line between the social media application and the game application would be 3×0.5=1.5.

In embodiments of the invention, a final adjustment is made by relationship module 108 to keep the thickness of a relationship line relative to all other relationship lines being presented in relationship information screen 120. This may be used to prevent a line that looks like a box. By way of example, if calculated values of five relationship lines are: 0.5, 0.5, 1, 1.5 and 10, the thickness for the "10" line can be drawn as a "2" to keep relationship lines more proportional. In embodiments, the thickness of a relationship line represents a value of the current use or historical use of a resource by the primary app. For example, a very thick line (e.g., 130*c*) can represent very high memory utilization, while a relatively thin line (e.g., 130*a*) can represent little memory use. A simple algorithm may be utilized to determine relative thickness based upon percent (%) of the memory used versus total system memory.

Referring back to FIG. 3, after a thickness value is calculated at step 204, relationship module 108 may optionally calculate a color or line type value for each relationship at step 206. In accordance with aspects of the invention, color or line type calculations can be performed utilizing a simple look up table of user preferences, which are assigned colors and/or line types to specify different relationships. The colors and/or line type can also represent meaning based upon the type of resource or application the relationship line is extending to. In one example, the color red indicates that the primary app accesses secure data, light blue indicates one way read access-in, dark blue indicates one way read access-out, and black indicates two way read access. By way of another example, if a relationship line is extending from a primary app 122 to a power source icon, the color green can be utilized to indicate that the usage is low, the color yellow can be utilized to indicate that the usage is medium, and the color red can be utilized to indicate that the usage is high. Optionally, line type (e.g., dashed lines, dotted lines, etc.) can be utilized to impart information to a user. By way of example, a relationship line can be depicted as a hollow line (e.g., 130*d*) to indicate that there is a potential relationship (e.g., a disabled parameter that can be enabled by a user) between a primary app and another application and/or resource.

At step 208, relationship module 108 causes icons for each participating application and/or computer device resource to be displayed on relationship information screen 120. In embodiments, all applications and computer device resources having a relationship or potential relationship with the primary app are depicted. Alternatively, system 100 enables a user to customize relationship information screen 120 to only show applications and/or resources that are relevant to the concerns of the user.

At step 210, relationship module 108 causes relationship lines (e.g. 130*a*-130*d*) to be displayed or drawn between the primary app (e.g., 122) and other applications (e.g., 124*a*-124*e*) and/or resources (e.g., 126*a*-126*g*), using the calculated thickness values from step 204, and optionally, color and/or line type values from step 206.

Figure 5:
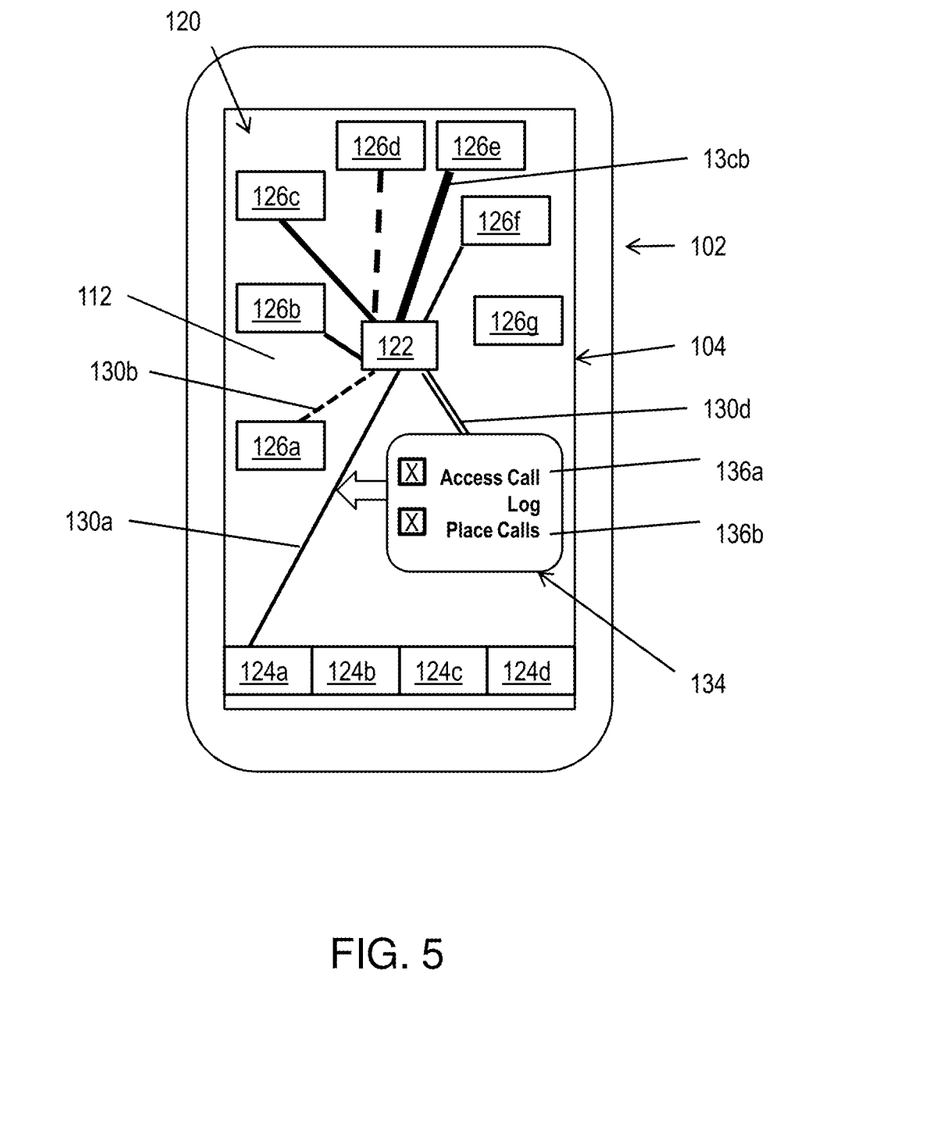
FIG. 5 shows an exemplary parameter control window in accordance with aspects of the invention.

FIGS. 3 and 5 will now be referenced with respect to the manner in which a user may utilize system 100 to manage relationships in accordance with aspects of the invention. At step 212, a user selects a relationship line. Any manner of selecting a relationship line may be utilized. By way of example, a user's finger can touch a select relationship line using user interface 112.

At step 214, relationship module 108 determines that a user has selected a relationship line at step 212 and presents a relationship selection table (e.g., 134) to the user. A relationship selection table lists one or more parameter control options (136a, 136b), which can be selected by a user to enable or disable a respective parameter in accordance with a user's wishes. By way of example, a user can select a relationship line 130a between a primary app 122 and a telephone application 124a.

At step 216, after relationship selection table 134 is displayed in accordance with step 214, the user can select a parameter control option (e.g., 136a, 136b) to enable or disable a particular parameter. By way of example, a user can enable (e.g., check a box) or disable (e.g., uncheck a box) access of primary app 122 to a call log of telephone application 136a or enable or disable the ability of the primary app to place a call through telephone application 136b.

At step 218, relationship module 108 recognizes the user's command to execute at least one parameter control action (e.g., the user's command to enable or disable parameters 136a, 136b) and executes the parameter control action (e.g., enables or disables a parameter according to the user's command selection). By way of example, relationship module 108 may cause the OS to change permissions in a permissions table according to the user selection. In this way, control of a primary app's relationships with other applications and computer device resources is controlled by the OS of the computer device, as opposed to being controlled by the primary app itself. In embodiments, relationship module 108 will update relationship information screen 120 to reflect any changes in relationships between the primary app and the additional applications and/or resources. By way of example, if a user disables parameters 136a and 136b of FIG. 5, relationship module 108 causes relationship line 130a be updated to reflect this change. For example, relationship line 130a may be changed to a hollow line to indicate that there is no active relationship between primary app 122 and application 124a.

Optionally, at step 220, relationship module 108 can issue an alert to a user. By way of example, relationship module 108 can cause a relationship line to start blinking and/or can cause the relationship line to change colors (e.g., a bright red color) to indicate an undesirable relationship state. An undesirable relationship state may include a relationship line thickness that exceeds a predetermined threshold value. This may occur, for example, if a primary app is utilizing excessive battery power or memory. By way of another example, an alert may be issued if relationship module 108 detects an inappropriate app interaction has occurred, such as if write access into a computer device's storage is enabled for a primary app (this is how malware may be deposited onto a phone). In this example, relationship module 108 may cause a relationship line to change from black to a bright red color. Optionally, a user may set threshold warning values. Such threshold values may be based on historic interactions between a primary app and other applications and/or resources. For example, relationship module 108 may recognize when a relationship on a subsequent day is different from the relationship on a previous day, may recognize when a non-user implemented change to a relationship occurs, and/or may track average relationship information over time. In one example, if data exchanged between a primary app and another application exceeds a historic average data exchange by a predetermined value, relationship module 108 may cause a relationship line between the primary app icon and the other application icon to display in red.

In embodiments, a service provider (e.g., service provider 114), such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for visualization and control of application interactions. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, by a computer device, a selection of a primary application on the computer device;
   retrieving, by the computer device, information regarding a relationship between the and a resource of the computer device;
   calculating, by the computer device, a thickness value for the relationship, wherein the thickness value represents at least one parameter of interest to a user;
   displaying, by the computer device, icons representing the selected primary application and the resource of the computer device;
   displaying, by the computer device, at least one relationship line extending between the selected primary application and the resource of the computer device, wherein the at least one relationship line has a line weight based on the thickness value;
   wherein the resource of the computer device is selected from at least one of the group consisting of: a power source, a memory, a touch screen, a central processing unit and system devices of the computer device.

2. The method of claim 1, further comprising calculating, by the computer device, a color value for the relationship, wherein the color value represents another parameter of interest to the user and the at least one relationship line has a color based on the color value.

3. The method of claim 1, further comprising calculating, by the computer device, a line type numeric value for the relationship, wherein the line type represents an additional parameter of interest to the user and the at least one relationship line has a line type based on the line type numeric value.

4. The method of claim 1, wherein the parameter of interest is one of: a number of relationships; the current application or resource utilized; volume of traffic; an amount of personal information accessible to the selected primary application; how often information is accessed; one-way communication; two-way communication; historical utilization; an amount of the resource utilized; a potential relationship between the selected primary application and the resource; read access; write access; access to secure data.

5. The method of claim 1, further comprising:
receiving, by the computer device, a selection of the at least one relationship line;
displaying, by the computer device, at least one parameter control action for the at least one parameter of interest; and
receiving, by the computer device, a command to execute the at least one parameter control action; and
executing, by the computer device, the at least one parameter control action, wherein the execution of the parameter control action changes a relationship between the selected primary application and the resource of the computer device.

6. The method of claim 1, further comprising:
determining that an undesirable relationship state exists between the selected primary application and the resource of the computer device; and
displaying, by the computer device, an alert to the user through the at least one relationship line based on the determining that the undesirable relationship state exists.

7. The method of claim 6, wherein the alert comprises displaying the at least one relationship line in a color, in a line type, in a line behavior, or in a combination thereof, wherein the color, line type and/or line behavior is indicative of the undesirable relationship state.

8. A computer program product for visualizing and controlling application interactions, the computer program product comprising a computer readable storage medium having program instructions embodied therewith, the program instructions executable by a computing device to cause the computing device to:
receive a selection of a primary application;
retrieve information regarding a first set of relationships between the selected primary application and another application;
retrieve information regarding a second relationship between the selected primary application and a resource of the computing device;
display icons representing the selected primary application, the other application, and the resource of the computing device;
display a first relationship line between the selected primary application and the other application, wherein the relationship line has a line thickness based on a total numeric thickness value of the first set of relationships; and
display a second relationship line between the second primary application and the resource of the computing device, wherein each of the first and second relationship lines has a line weight, line type, line behavior, or line color that visually imparts relationship information to a user.

9. The computer program product of claim 8, wherein the program instructions further cause the computing device to calculate the numeric thickness value of the first set of relationships and a numeric thickness value for the second relationship, wherein the numeric thickness values represents a degree, value, or intensity of the respective first set of relationships and the second relationship, and wherein each of the first and second relationship lines have a line weight that visually conveys the degree, value or intensity of the respective first set of relationships and second relationship to the user.

10. The computer program product of claim 8, wherein the program instructions further cause the computing device to calculate a color value or a line type value for each of the first set of relationships and the second relationship, wherein the color or line type value represents a parameter of interest, and wherein the respective first and second relationship lines are displayed with a color or line type that visually conveys information regarding the parameter of interest to the user.

11. The computer program product of claim 8, wherein the information includes information regarding one or more of: a number of relationships; the current application or resource utilized; volume of traffic; an amount of personal information accessible to the selected primary application; how often information is accessed; one-way communication; two-way communication; historical utilization; the amount of a resource utilized; a potential relationship between a selected primary application and another application and/or resource; read access; write access; access to secure data.

12. The computer program product of claim 8, wherein the other application and the resource of the computing device include one or more of: a social media application; a GPS application; a wireless network resource; a Bluetooth application; a computer device memory; an energy resource; a contact list; a computer browser application; a telephone application; a music application; an email application; a microphone application; a camera application; and a touch screen application.

13. The computer program product of claim 8, wherein the program instructions further cause the computing device to:
receive a selection of one of the first and second relationship lines;
display at least one parameter control action for at least one parameter of interest, wherein the at least one parameter control action is configured to allow a user to enable or disable the at least one parameter of interest;
receive a command to execute the at least one parameter control action; and
execute the at least one parameter control action.

14. The computer program product of claim 8, wherein the program instructions further cause the computing device to display an alert to the user through at least one of the first and second relationship lines.

15. A system for visualizing and controlling application interactions, comprising:
a CPU, a computer readable memory and a computer readable storage medium associated with a computing device;
program instructions to retrieve information regarding a first relationship between a primary application and another application;

program instructions to retrieve information regarding a second relationship between the primary application and a computer device resource;

program instructions to display icons representing the primary application, the other application, and the computer device resource;

program instructions to determine that at least one of the first and second relationships is in an undesirable state based on at least one predetermined threshold value;

program instructions to display a first relationship line between the primary application and the other application;

program instructions to display a second relationship line between the primary application and the computer device resource, wherein each of the first and second relationship lines has a line weight, line type, line behavior, or line color that imparts information regarding at least one parameter to a user;

program instructions to receive a selection of one of the first and second relationship lines;

program instructions to display at least one parameter control action based on the selection;

program instructions to receive a command to execute the at least one parameter control action; and program instructions to execute the at least one parameter control action to cause the operating system of the computing device to change permissions in a permission table based on the received command such that the primary applications relationship with one of the other application and the computer device resource is controlled by the operating system of the computing device, wherein the program instructions are stored on the computer readable storage medium for execution by the CPU via the computer readable memory.

16. The system of claim 15, wherein the at least one parameter control action allows the user to enable or disable the at least one parameter.

17. The system of claim 15, further comprising program instructions to calculate a thickness value for each of the first and second relationships, wherein the thickness value represents a degree, value, or intensity of the respective first and second relationship, and wherein each of the first and second relationship lines have a line weight that visually conveys the degree, value or intensity of the respective first and second relationship to the user.

18. The system of claim 15, further comprising program instructions to display an alert to the user through at least one of the first and second relationship lines based on the determining that the at least one of the first and second relationships is in the undesirable relationship state.

19. The system of claim 15, further comprising program instructions to display the first and second relationship lines with a color, line type, line behavior, or combination thereof, wherein the line color, line type and/or line behavior visually conveys additional information regarding at least one parameter to the user.

* * * * *